United States Patent [19]
Stewart, III

[11] Patent Number: 4,882,794
[45] Date of Patent: Nov. 28, 1989

[54] DISPOSABLE WASTE CONTAINMENT UNIT

[76] Inventor: Elijah E. Stewart, III, 117 Cameron Ct., Cary, N.C. 27511

[21] Appl. No.: 338,531

[22] Filed: Apr. 14, 1989

Related U.S. Application Data

[63] Continuation-in-part of Ser. No. 160,523, Feb. 26, 1988, abandoned.

[51] Int. Cl.$^4$ .......................... A47K 11/02; A61G 9/00
[52] U.S. Cl. ............................................. 4/451; 4/452
[58] Field of Search ................... 4/449, 451, 452, 453; 604/317, 333, 339, 355, 359, 360

[56] References Cited

U.S. PATENT DOCUMENTS

| | | | |
|---|---|---|---|
| 3,475,767 | 11/1969 | Friesen et al. | 4/452 |
| 3,654,064 | 4/1972 | Laumann | 4/451 X |
| 3,763,502 | 10/1973 | Laumann | 4/452 |
| 4,509,215 | 4/1985 | Paz | 4/452 |
| 4,759,086 | 7/1988 | Booth-Cox | 4/452 X |

Primary Examiner—Philip R. Coe
Attorney, Agent, or Firm—Lynn E. Barber

[57] ABSTRACT

A disposable waste containment unit, comprising a liquid impermeable bag layer having an absorbent element therein and a gathering means at the upper rim of the bag. The unit may also have an absorbent liner within the impermeable bag layer. The unit may be of a size to be placed in a toddler training pot or, alternatively, in a bedpan.

12 Claims, 3 Drawing Sheets

DISPOSABLE WASTE CONTAINMENT UNIT

CROSS-REFERENCE TO RELATED APPLICATIONS

This is a continuation-in-part of the co-pending application Ser. No. 07/160,523 filed Feb. 26, 1988 now abandoned.

BACKGROUND OF THE INVENTION

1. Field of the Invention

The present invention relates generally to a disposable waste containment unit to be placed in a receiving vessel for human wastes.

More specifically, the invention relates to a disposable bag of a size to fit in a receiving vessel such as a toilet training unit or a bedpan for collection of liquid and solid waste to eliminate the need for cleaning the receiving vessel.

2. Description of the Related Art

The use of portable toilet training units by toddlers or of bedpans by patients or those who are bedridden requires that parents or other caretakers must clean the toilet training units or bedpans after they are used by the toddlers or patients. This is an unpleasant and time-consuming task, and may also aid in the spread of disease.

Although there are many different shapes and designs of toilet seats, children's "potty chairs," training chairs, and commodes that are plastic or portable, they do not solve the problem of containing the waste products and allowing easy, neat and sanitary disposal of the waste products.

Toilet seat guards to protect the seat or surrounding area from being soiled have been developed but do not contain the waste itself. For example, a guard for a children's toilet seat is disclosed by De Puy et al. (U.S. Pat. No. 2,100,774). The guard is comprised of a multiply lobed flexible piece. It is placed at the front open span of a toilet seat to protect the area beneath the opening and is attached to the seat by means of attaching lugs.

Accordingly, there is a need for a disposable waste containment unit for insertion in or use in place of standard toilet training pots for toddlers. There is also a need for a disposable waste containment unit to be placed in the bottom of bed pans to relieve the burden of caring for bedridden persons.

It is therefore an object of the present invention to provide a disposable waste containment unit for toddlers that can eliminate the need for cleaning the training pot in toilet training units.

It is another object of the invention to provide a training unit for toddlers that can be used as a plastic cover to line pots for toddlers.

It is another object of the invention to provide a training unit for toddlers that can be used as a stand-alone unit without the need for a pot.

It is another object of the invention to provide a disposable waste containment unit that may be placed in bedpans for easy disposal of the wastes.

Other objects and advantages of the invention will be more fully apparent from the ensuing disclosure and appended claims.

SUMMARY OF THE INVENTION

In a broad aspect, the present invention relates to a disposable waste containment bag having a liquid impermeable exterior surface and an internal absorbent element.

In another aspect of the invention broadly described above, the invention relates to a disposable training unit for toddlers comprising a disposable bag that may either be inserted in a training pot or may be used without a training pot.

In another aspect of the invention as described above, the invention relates to a disposable waste collection bag that may be placed in a bedpan. Other features and embodiments of the invention will be more fully apparent from the ensuing disclosure and appended claims.

DETAILED DESCRIPTION OF THE INVENTION, AND PREFERRED EMBODIMENTS THEREOF

The disposable waste containment unit of the invention is designed to provide a unit that may be inserted into a conventional toddler training pot to allow waste to be captured in the bag of the invention instead of in the training pot itself. The waste may then be discarded along with the disposable waste containment unit, serving as special purpose garbage bag.

The disposable waste containment unit of the invention may also serve as a stand-alone unit. This stand-alone unit serves the same functions as the disposable waste containment unit that is inserted into a training pot, acting as a container for the waste and as a totally disposable means of discarding the waste. This embodiment of the invention is particularly useful when a training pot is not readily available. Thus this embodiment may be inserted in the opening of training chairs In another embodiment, the disposable unit of the invention is of enlarged size to enable it to fit in a larger receiving vessel such as a bedpan. The disposable unit of the invention when made of the appropriate size may also be used with bedside commodes.

The training unit of the invention is constructed of durable water impermeable material to keep the liquid waste from leaking out. The top of the unit may have a gathered area or a draw-string around it so that the waste and the unit can be easily and neatly discarded. The inside of the disposable training unit comprises absorbent material. In one embodiment the absorbent material is placed at the bottom of the unit to absorb the liquid portion of the waste.

Figure 1:
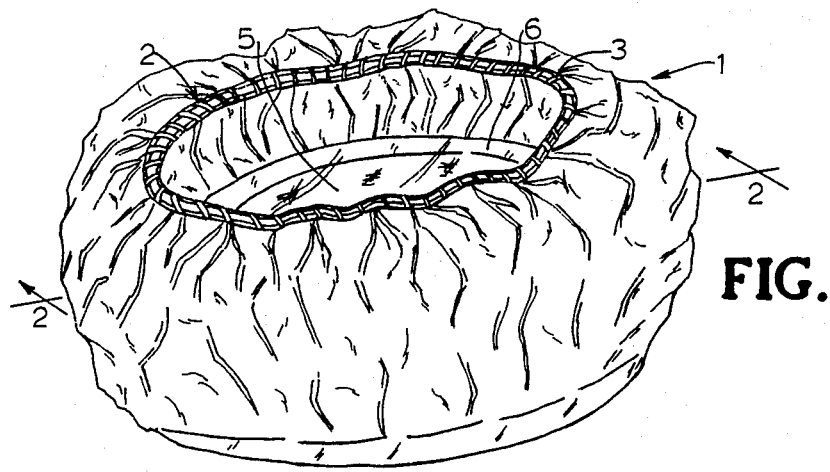
FIG. 1 is a perspective view of the disposable unit of the invention.

FIG. 1 shows the disposable bag 1 of the invention. The disposable bag 1 is preferably formed from a circle of appropriate impermeable, flexible material (see below). The upper rim 2 of the bag 1 is gathered so that the diameter of the opening of the bag 1 is less than that of the side areas of the bag 1. The preferred gathered rim is soft and flexible so that it may be pulled to fit over a variety of sizes of openings, and is not limited to a particular size of vessel or rim area.

Figure 2:
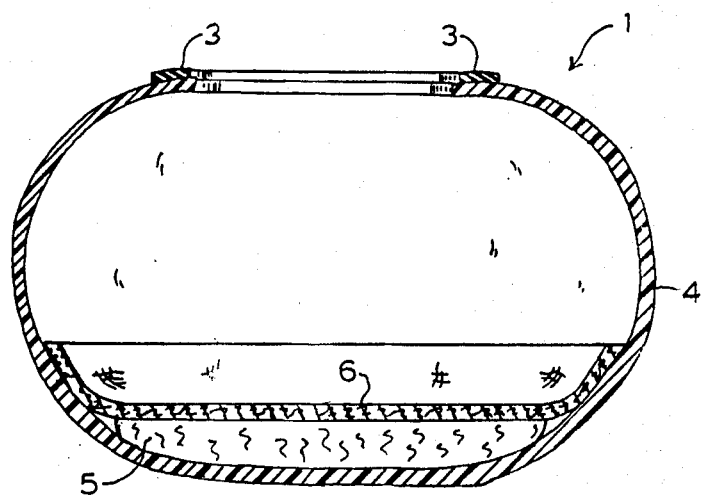
FIG. 2 is sectional elevational view of the disposable unit of the invention.

The structure of the disposable bag 1 is shown in detail in FIG. 2. In the preferred embodiment, the upper rim 2 is gathered by stitching over a piece of elastic material around the edge of the circle of material used to make the disposable bag 1, using commercial gathering techniques, with the result that a piece of elasticized material 3, such as elasticized thread or an elastic band is attached to the upper rim 2 of the bag 1. The elasticized material 3 may be sewed or glued to the upper rim 2. A technique that has been found to work well comprises an edge stitching process wherein a piece of stretchable material is sewn to the edge area while the stretchable material is extended, so that when the stretchable material is allowed to relax, the edge of the bag is gathered. A gathered, soft rim as is provided by the invention allows the disposable unit to be easily and quickly placed in a vessel by stretching the rim area, and similarly, to be easily and quickly removed from the vessel after use. A twist tie may be tied around the opening of the bag to close it firmly. The need to tie or otherwise manipulate a drawstring, which often has a tendency to break or pull free from the bag, is thus avoided by the preferred embodiment of this invention. The elasticized material 3 may also comprise thermally heatshrinkable material that is sewed around the upper rim, followed by application of heat sufficient to induce shrinkage to the desired degree. The upper rim 2 may also be gathered in any other suitable manner known in the art for providing elasticized openings.

The bag is constructed of an impermeable outer layer 4. Preferably this layer 4 is made of light-weight flexible plastic. A preferred plastic is a co-extruded polyethylene having sufficient flexibility, structural stability and moisture impermeability for the intended purpose of the invention, without requiring substantially expenditures. Thus, a preferred co-extruded polyethylene comprises a high percentage of polyethylene and a low percentage of cellophane, polyvinylchloride and/or urethane such as white polyethylene as is known in the art, and provides a lightweight, flexible, waterproof bag. Preferably the plastic is not thinner than 1 mil to avoid tearing of the bag, nor thicker than 2¾ mil to maintain flexibility. Most preferred is a thickness of about 2 mil. The layer 4 may also be constructed of any other light-weight, flexible impermeable material including but not limited to, natural or synthetic rubbers, and impermeable or water-proofed fabrics.

Figure 6:
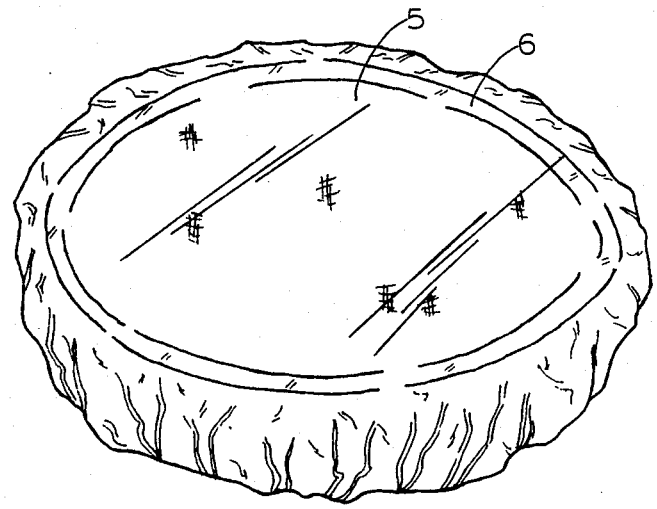
FIG. 6 is a perspective view of the bottom of the disposable unit of the invention.

An absorbent element 5 is positioned at the bottom of the bag 1 formed by the outer layer 4. Preferably this absorbent element 5 is constructed of an absorbent padding material such as cotton. To increase the absorbent characteristics of the invention, a second inner layer 6 may be provided that is an absorbent fiber liner fitting inside the impermeable outer layer 4 and fitting over the top of the absorbent element 5 so that the absorbent element 5 is positioned between the outer layer 4 and the inner layer 6. The inner layer 6 may be constructed of thin absorbent fabric or paper or synthetic cellulose material. It is important that the entire inner layer be water absorbent so that liquid contacting any portion of the inner layer 6 will immediately soak into and through the inner layer 6 to the absorbent element 5 below. Preferably the inner layer 6 is circular with a diameter of about 6 inches (for a 4-inch absorbent element 5) and is centered over the absorbent element so that it extends for no more than about an inch beyond the edges of the absorbent element 5 (FIGS. 2 and 6). Preferably, the inner layer 6 does not extend substantially further up the sides of the bag so that the top of the bag and the rim area will not retain moisture.

The outer layer 4, absorbent element 5 and inner layer r6 are preferably laminated together by standard lamination bonding processes. The portion of the inner layer 6 that extends beyond the edges of the absorbent element 5 facilitates firm bonding of the inner layer 6 to the outer layer 4 to help to hold the absorbent element in place. This extending layer also absorbs liquid that contact the sides of the bag above the absorbent element 5 and conveys the liquid downward to the absorbent element. The inner layer 6 may be glued to the outer layer 4 at sufficient locations to keep the two layers properly aligned with respect to each other. In the preferred embodiment the absorbent element 5 is a thin circular cylinder having diameter of about 4–6 inches (preferably about 4 inches) and a generally uniform thickness of at least ⅛ inch. Preferably, the thickness is about ¼ inch to ⅜ inch. In a second embodiment of the invention absorbent element 5 is thicker at its center and is tapered toward its outside edges to provide maximum absorption at the bottom of the bag 1.

Figure 3:
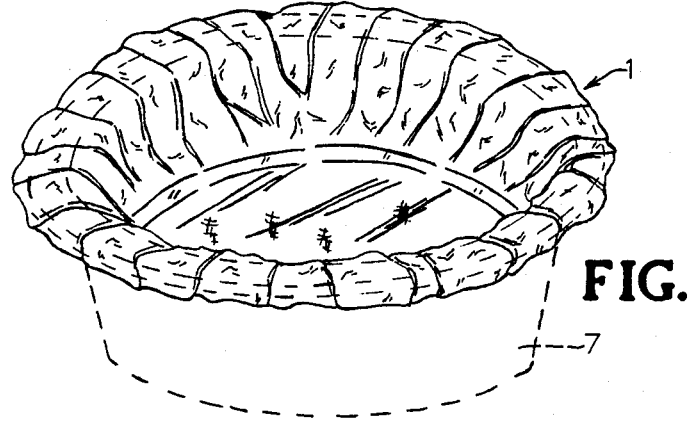
FIG. 3 is a perspective view of the disposable unit of the invention in a receiving vessel.
Figure 4:
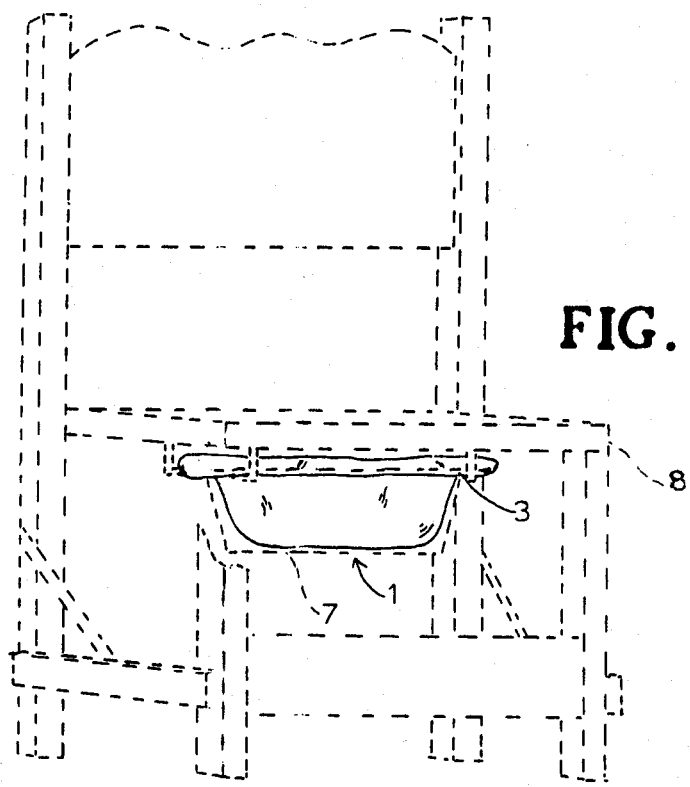
FIG. 4 is a perspective view of the disposable unit of the invention in a training chair.
Figure 5:
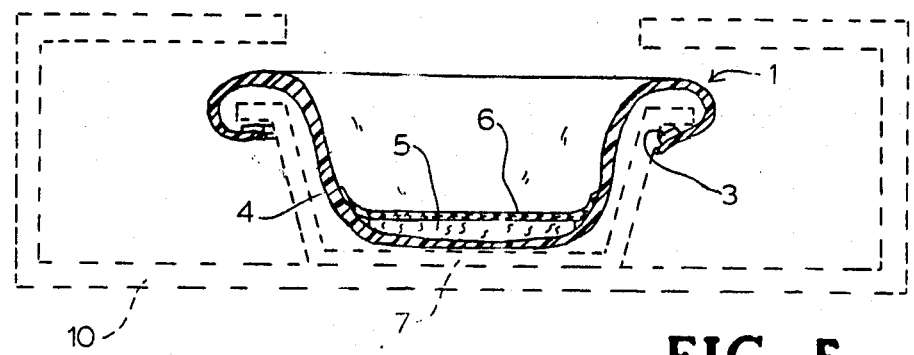
FIG. 5 is sectional elevational view of the disposable unit of the invention, as used with a training pot.

As illustrated in FIG. 3, the elasticized gathering at the upper rim 2 of the bag 1 allows the bag 1 to be positioned within a receiving vessel 7 with the gathered upper rim 2 being folded over the upper edge of the receiving vessel 7. The receiving vessel 7 shown in FIG. 3 may be a bedpan or the pot of a toilet training unit or other waste disposal vessel. The unit of the invention may also be placed within the pot of a training chair 10 (FIG. 4). The bag 1 may be held in place by the stretched elasticized material 3 stretched tightly around the outside of the appropriate pot below its upper edge as shown in FIG. 5 for a toilet pot in a toilet training unit 10.

Further, while preferred and illustrative embodiments of the invention have been described, it will be appreciated that numerous modifications, variations, and other embodiments are possible, and accordingly, all such apparent modifications, variations, and embodiments are to be regarded as being within the spirit and scope of the invention.

What is claimed is:

1. A disposable waste containment unit, comprising:
   (a) a liquid impermeable flexible bag layer formed from circle of co-extruded polyethylene, said bag layer having a gathered upper rim and a bottom;
   (b) an absorbent cellulose element, said absorbent element being located at the bottom of the bag layer; and
   (c) a thin absorbent liner within said bag layer, said liner extending beyond the edge of said absorbent element but not extending to the upper rim, said absorbent element disposed between said bag layer and said liner.

2. A waste containment unit according to claim 1, wherein the means for gathering the upper rim comprises an elasticized upper rim of the bag.

3. A waste containment unit according to claim 2, wherein the elasticized upper rim of the bag fits over the edge of a toilet training pot.

4. A waste containment unit according to claim 2, wherein the elasticized upper rim of the bag fits over the edge of a bedpan.

5. A waste containment unit according to claim 1 wherein the means for gathering the upper rim comprises a drawstring.

6. A waste containment unit according to claim 1, further comprising a drawstring.

7. A waste containment unit according to claim 1, further comprising a hardened segment attached to the upper rim.

8. A waste containment unit according to claim 1, wherein the absorbent element has a central area and outside edges, said central area being thicker than said outside edges.

9. A waste containment unit according to claim 1, wherein the absorbent element is made of synthetic cellulose and is of a circular cylindrical shape with a diameter of about four inches and a height of about ⅛ to ⅜ inches.

10. A waste containment unit according to claim 1, wherein the absorbent element is circular and the liner extends about one inch beyond the edge of the absorbent element; and said liner, absorbent element and bag layer are laminated together.

11. A waste containment unit according to claim 1, wherein the gathered upper rim comprises an elastic gather.

12. A waste containment unit according to claim 1, wherein the bag layer has a thickness of about 2 mil.

* * * * *

UNITED STATES PATENT AND TRADEMARK OFFICE
CERTIFICATE OF CORRECTION

PATENT NO. : 4,882,794

DATED : November 28, 1989

INVENTOR(S) : Elijah E. Stewart

It is certified that error appears in the above-identified patent and that said Letters Patent is hereby corrected as shown below:

Column 2, line 17: after "is", insert --a--.

Column 3, line 37: replace "substantially" with --substantial--.

Column 4, line 6: delete the "r" that is before the numeral "6".

Column 4, line 12: delete "contact" and replace it with --contacts--.

Signed and Sealed this

Second Day of October, 1990

Attest:

HARRY F. MANBECK, JR.

*Attesting Officer*  *Commissioner of Patents and Trademarks*